(12) United States Patent
Duenchel et al.

(10) Patent No.: US 8,403,363 B2
(45) Date of Patent: Mar. 26, 2013

(54) PIVOTABLE ROLL BAR

(75) Inventors: Diana Duenchel, Andernach (DE);
Matthias Bender, Rheinboellen (DE);
Thomas Darscheid, Boppard (DE)

(73) Assignee: Bomag GmbH, Boppard (DE)

( * ) Notice: Subject to any disclaimer, the term of this patent is extended or adjusted under 35 U.S.C. 154(b) by 14 days.

(21) Appl. No.: 13/077,050

(22) Filed: Mar. 31, 2011

(65) Prior Publication Data
US 2011/0248488 A1 Oct. 13, 2011

(30) Foreign Application Priority Data
Apr. 9, 2010 (DE) .................. 20 2010 004 753 U

(51) Int. Cl.
*B60R 21/13* (2006.01)

(52) U.S. Cl. .................. 280/756; 296/105; 296/190.03; 296/207

(58) Field of Classification Search .................. 280/748, 280/756; 296/105, 190.03, 207
See application file for complete search history.

(56) References Cited

U.S. PATENT DOCUMENTS

| | | | |
|---|---|---|---|
| 5,779,272 A | | 7/1998 | Panek et al. |
| 5,839,758 A * | | 11/1998 | Finch et al. .................. 280/756 |
| 7,568,732 B2 * | | 8/2009 | Schlup, Jr. .................. 280/756 |
| 7,661,709 B2 * | | 2/2010 | Becker .................. 280/756 |
| 7,677,599 B2 | | 3/2010 | Kurten et al. |
| 7,971,905 B2 * | | 7/2011 | McCord et al. .................. 280/756 |
| 8,016,320 B2 * | | 9/2011 | Becker .................. 280/756 |
| 2005/0073140 A1 * | | 4/2005 | Boucher .................. 280/756 |
| 2007/0182147 A1 | | 8/2007 | Cooper et al. |
| 2007/0290493 A1 * | | 12/2007 | David .................. 280/756 |
| 2010/0140911 A1 | | 6/2010 | Kurten et al. |

FOREIGN PATENT DOCUMENTS

| | | |
|---|---|---|
| CN | 1672984 A | 9/2005 |
| DE | 19546425 A1 | 6/1996 |
| DE | 10 2004 014 475 A1 | 10/2005 |
| EP | 1 197 399 A2 | 4/2002 |
| EP | 1 844 990 A2 | 10/2007 |
| GB | 1 522 285 A | 8/1978 |

OTHER PUBLICATIONS

German Patent and Trademark Office, Search Report, Application No. DE 20 2010 004 753.6, filed Apr. 9, 2010, Search completed on Jan. 20, 2011 (4 pages).
Espacenet, English Translation of DE 195 46 425 A1, Published on Jun. 13, 1996, retrieved on Jul. 5, 2012 from http://worldwide.espacenet.com (8 pages).
European Patent Office, European Search Report, Application No. EP11 00 2178, Mailed Oct. 5, 2011 (3 pages).

* cited by examiner

*Primary Examiner* — Toan To
(74) *Attorney, Agent, or Firm* — Wood, Herron & Evans, LLP

(57) ABSTRACT

The present invention relates to a roll bar for a cab-less construction machine, in particular a vibration roller, which is implemented so it is adjustable in height between an operating position and a transport position. The roll bar includes a pivotable tube bow, which comprises two vertical pivot tubes; two stand tubes, which are fixedly connected to the frame of the construction machine; two connection elements, via which the pivot tubes are connected to the stand tubes, the connection elements each comprising a stop surface, against which the pivot tube can be moved to, in particular pressed, in the operating position; a lock for clamping the pivot tube against the connection element in the operating position; a welding surface, to which the stand tube is materially bonded; and a pivot joint having a pivot axis, around which the pivot tubes are pivotable. The connection elements each comprise two sheet-metal parts, which are symmetrical to one another, the stop surfaces and the welding surfaces being implemented as edge profiles of the sheet-metal parts, and the welding surfaces being oriented essentially horizontally.

6 Claims, 5 Drawing Sheets

PIVOTABLE ROLL BAR

The present application claims priority under 35 U.S.C. §119 of German Patent Application No. 20 2010 004 753.6, filed Apr. 9, 2010, the disclosure of which is hereby incorporated herein by reference in its entirety.

FIELD OF THE INVENTION

The invention relates to a roll bar for a cab-less construction machine, in particular a vibration roller, which is implemented so it is adjustable in height between an operating position and a transport position.

BACKGROUND OF THE INVENTION

The roll bar according to one embodiment of the present invention comprises a pivotable tube bow which comprises two vertical pivot tubes, two stand tubes, which are fixedly connected to the frame of the construction machine, and two connection elements, via which the pivot tubes are connected to the stand tubes. The connection elements each comprise a stop surface, against which the pivot tube can be moved to, in particular pressed, in the operating position, a lock for clamping the pivot tube against the connection element in the operating position, a welding surface, to which the stand tube is materially bonded, and a pivot joint having a pivot axis, around which the pivot tubes are pivotable.

Construction machines are equipped with rollover protection devices or roll bars, which are fastened on the machine frame and extend upward, to protect an operator in case of a rollover of the machine. If the construction machine is equipped with a cab, the roll bar is normally integrated in the cab. In contrast, if the construction machine is implemented without a cab, which is often the case in smaller construction machines, the roll bar is typically implemented as freestanding, the roll bar generally being implemented as a U-shaped bow, whose free ends are fastened on the machine frame and whose crossbeam is situated essentially over the head of the operator. The roll bar is thus frequently the part of the construction machine which extends furthest upward.

Such an upwardly protruding roll bar can be disadvantageous during loading and during transport of the construction machine, for example. To overcome this problem, roll bars having folding mechanisms are known, which allow an upper area of the roll bar to be pivoted down and thus the height of the construction machine to be reduced. These folding mechanisms generally have locks, whereby the upper segment of the roll bar can be locked against the lower fixed segment of the roll bar in the folded-up state. Pivotable roll bars are known, in which the upper pivotable segment is connected using two pins to the lower, fixed segment. One pin is used as a hinge, which is situated fixed between the two segments. The other pin can be removed and thus allows the upper segment to be pivoted down. The locking pin is implemented parallel to the pivot axis of the hinge. It has a disadvantageous effect in this case that such a lock by pins is subject to play and the upper segment of the roll bar is deflected in the case of operationally-related vibrations. Furthermore, such a connection is complex to produce.

To overcome this problem, there are designs in which the upper segment of the roll bar is locked by multiple screw connections instead of a pin. It is disadvantageous in this case that the removal of the screws to pivot down the upper segment of the roll bar is only possible by using a tool. Furthermore, the screws are removed completely from the roll bar for pivoting down the upper segment and can easily be lost. The screw connection must also be produced using a predefined tightening torque and therefore can only be executed by trained personnel.

A pivotable roll bar is known from DE 10 2004 014 475 A1, which successfully overcomes the mentioned disadvantages of the prior art. There is nonetheless a need for a refinement of this roll bar, so that the weight and the costs can be reduced further.

The invention is therefore based on the object of providing a pivotable roll bar for a cab-less construction machine, in particular a vibration roller, which is implemented to save weight and cost with the greatest security.

SUMMARY OF THE INVENTION

The present invention is based on the finding that weight and cost savings over the use of solid U-shaped tube sections, known from DE 10 2004 014 475 A1, for example, can be achieved with the aid of the connection elements, which each comprise two sheet-metal parts symmetrical to one another. The sheet-metal parts according to the invention are symmetrical to one another with respect to a reference line, e.g., the longitudinal central axis of the pivot tube, and result in the connection element according to the invention through their interaction. Since the sheet-metal parts are easily producible by stamping, high manufacturing costs as a result of machining manufacturing methods, which are required with typical connection elements, are dispensed with.

Because the stop surfaces and the welding surfaces are implemented as edge profiles of the sheet-metal parts, parts may be saved, which would typically be welded onto the connection elements as separate parts. This not only saves weight and costs, but rather also increases the safety of the roll bar, since welding warping is reduced. Welding warping as a result of welding work on the connection elements is avoided according to the present invention in that, on the one hand, welded-on parts are extensively replaced by edge profiles and, on the other hand, the welding surfaces formed by edges are oriented essentially horizontally, onto which the parts to be welded on, namely the stand tubes, may be abutted. In this context, an edge profile is understood as a section of the sheet-metal part which is formed by simply edging the stamped-out sheet-metal tube part.

In an advantageous refinement of the invention, the pivot joints are implemented in such a way that the pivot axis runs through the pivot tubes. This saves additional weight and costs, since a separate rotation joint does not have to be provided. Instead, the rotation joint is implemented according to the present invention by a hole through the pivot tube, a hole through the connection element, and a simple screw, which is guided through the holes and terminally secured by a simple screw nut, for example.

In a further embodiment, the connection elements are materially bonded to the stand tubes using weld seams, the weld seams being at least partially peripheral fillet welds or butt welds, and being situated symmetrically with respect to the center point of the welding surfaces. Welding warping can thus be prevented as much as possible.

In a preferred embodiment of the invention, the lock has a clamping bolt and a locking screw, the clamping bolt and the locking screw being situated on the pivot tube side. In this way, comfortable locking which is free of play of the tube bow moved into the operating position is ensured, a loss of the clamping bolt and the locking screw as a result of inattentiveness being prevented.

In a further embodiment, the connection elements have recesses in the area of the clamping bolt, the recesses being implemented in such a way that the clamping bolt clamps the pivot tubes against the connection elements in the operating position and releases the pivot tubes in the transport position. This allows a simple change from the operating position (folded-up tube bow) to the transport position (folded-down tube bow) of the roll bar without additional tools, etc.

In a further advantageous refinement, the stand tubes have damping elements in the area of the connection to the frame of the construction machine. These damping means may be elastomeric, for example. The vibrations originating from the construction machine, which could result in health damage in the case of continuous load, may thus be effectively reduced.

BRIEF DESCRIPTION OF THE DRAWINGS

Preferred embodiments of the present invention are explained in greater detail hereafter on the basis of the appended drawings. In the schematic figures.

DETAILED DESCRIPTION OF THE INVENTION

Figure 1:
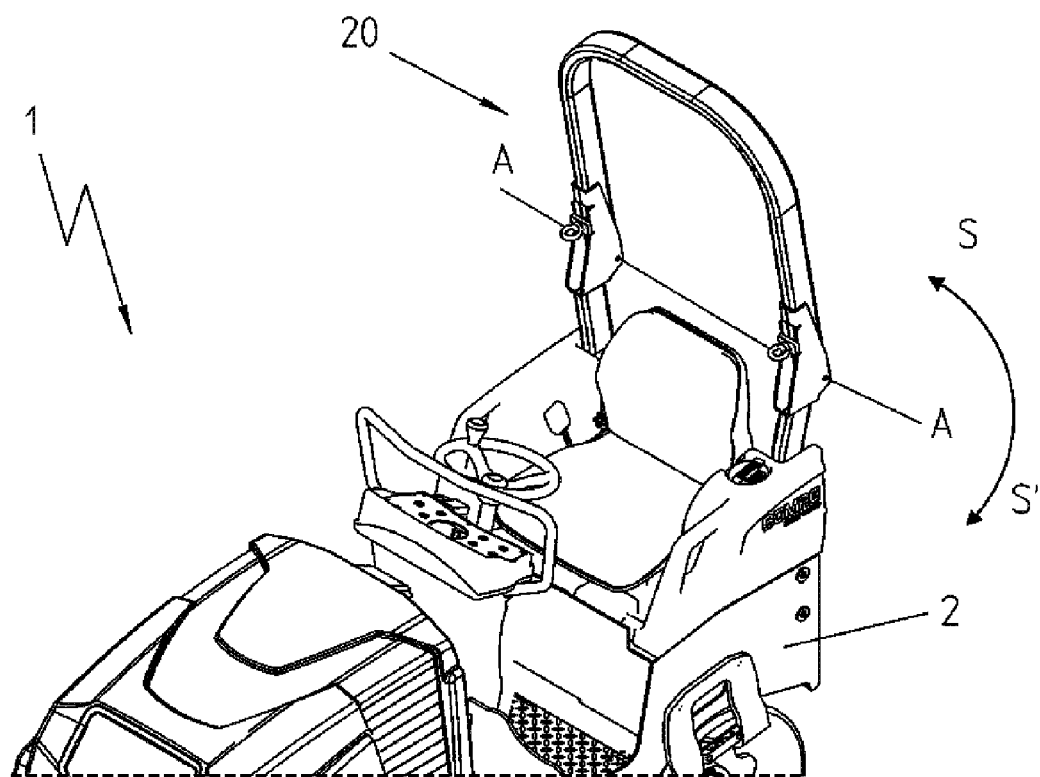
FIG. 1 shows a perspective view of a cab-less vibration roller having a pivotable roll bar in the operating position.

FIG. 1 shows a cab-less construction machine 1, which has a roll bar 20. The roll bar 20 is situated on the frame 2 of the construction machine 1. The upper part of the roll bar may be pivoted in the direction of the arrows S and S' between an operating position and a transport position around the pivot axis A.

Figure 2:
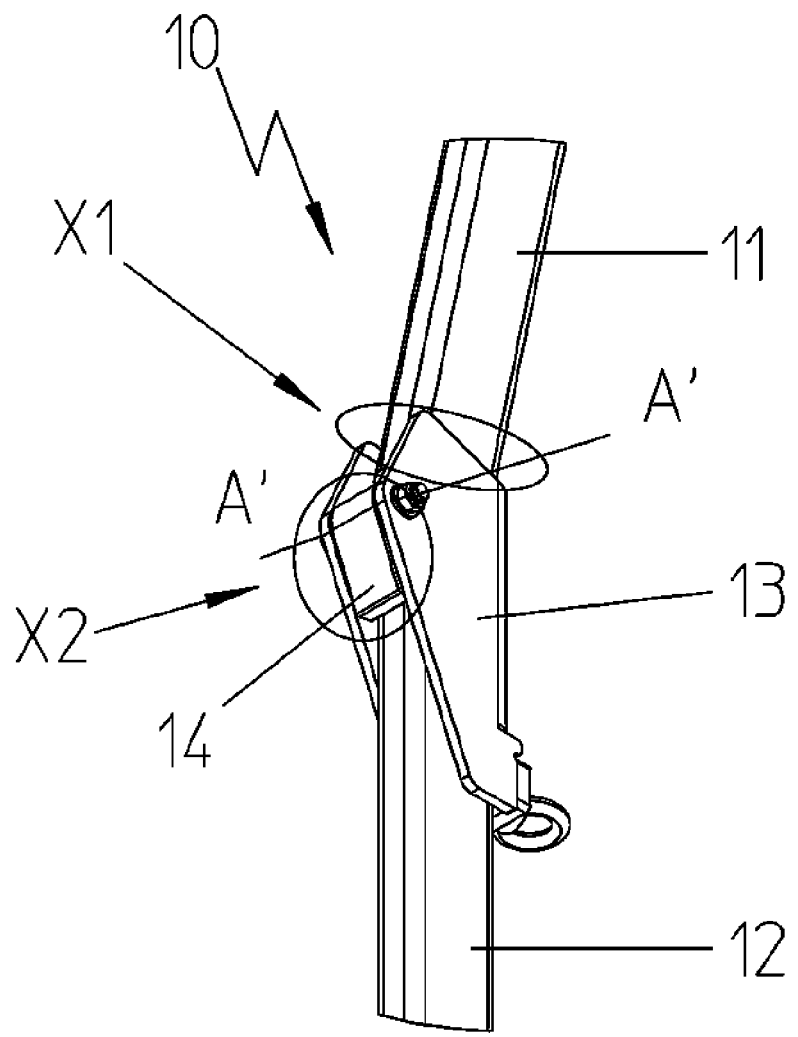
FIG. 2 shows a perspective view of a typical, pivotable roll bar.
Figures 3, 4:
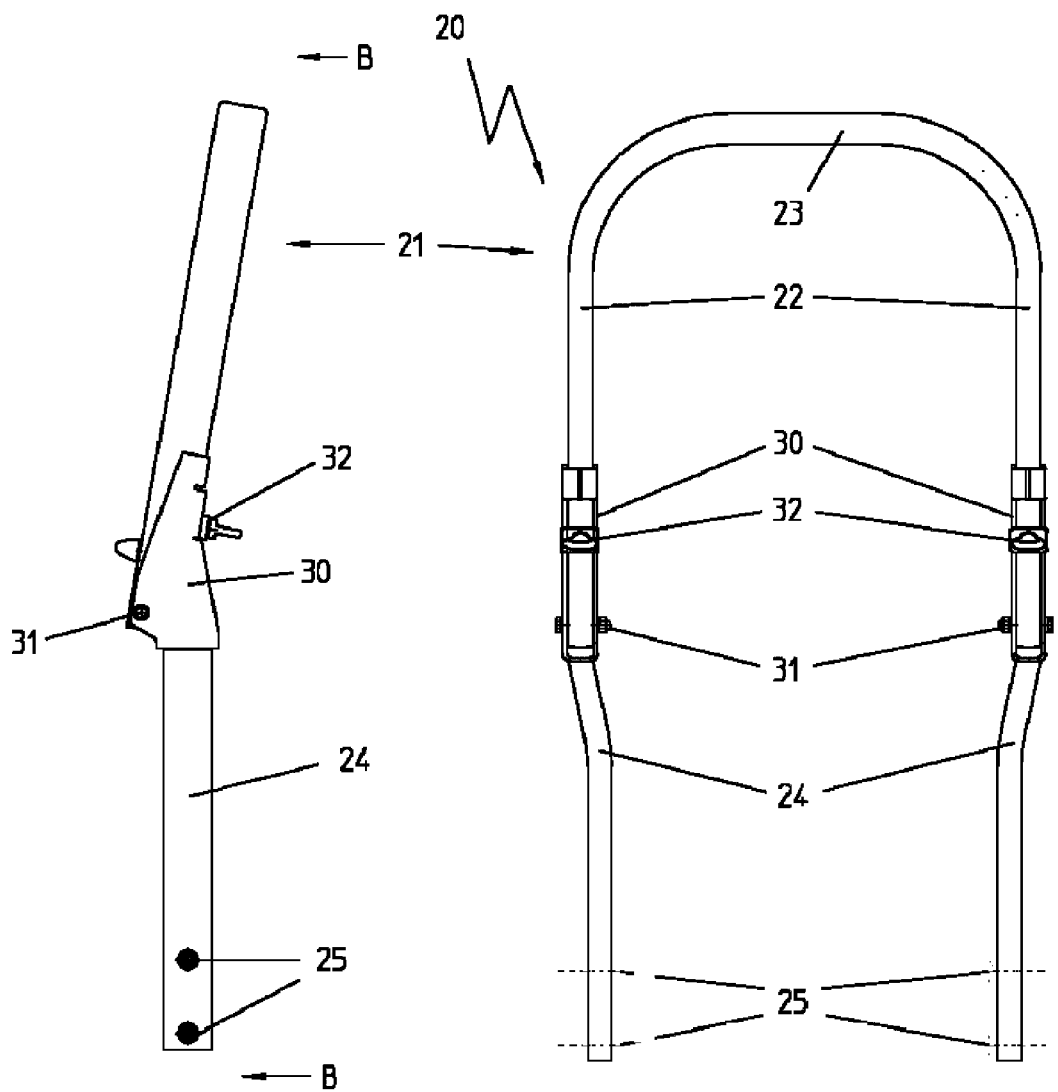
FIG. 3 shows a side view of the pivotable roll bar according to the invention in the operating position.
FIG. 4 shows a view of the roll bar from FIG. 3 in viewing direction B-B.

FIG. 2 shows a typical, pivotable roll bar 10 from the prior art, as from DE 10 2004 014 475 A1, for example. The solid joint reinforcement 13, which comprises a U-shaped tube section, ensures a connection of the upper spar 11 which is pivotable around the rotational axis A' in relation to the fixed bar 12. For this purpose, the upper spar 11 is welded to the joint reinforcement 13 in the area X1. A separate component 14, which is implemented as a stop and a rotation joint, is welded to the fixed spar in the area X2. Therefore, weld warping not only occurs in the joint reinforcement 13, but rather also in the spars 11, 12.

FIGS. 3 to 6 show various views of an embodiment of the roll bar 20 according to the present invention. The roll bar according to the present invention comprises a pivotable tube bow 21, which comprises two pivot tubes 22 and a transverse tube 23 connecting them. As in the example shown, the pivot tubes 22 and the transverse tube 23 are preferably implemented integrally, i.e., as a tube bow 21, in order to save further material and production costs. The tube bow 21 is connected via two connection elements 30 to the two stand tubes 24 so it is pivotable. The stand tubes 24 are connected fixedly to the frame 2 of the construction machine 1 via holes 25.

Figure 5:
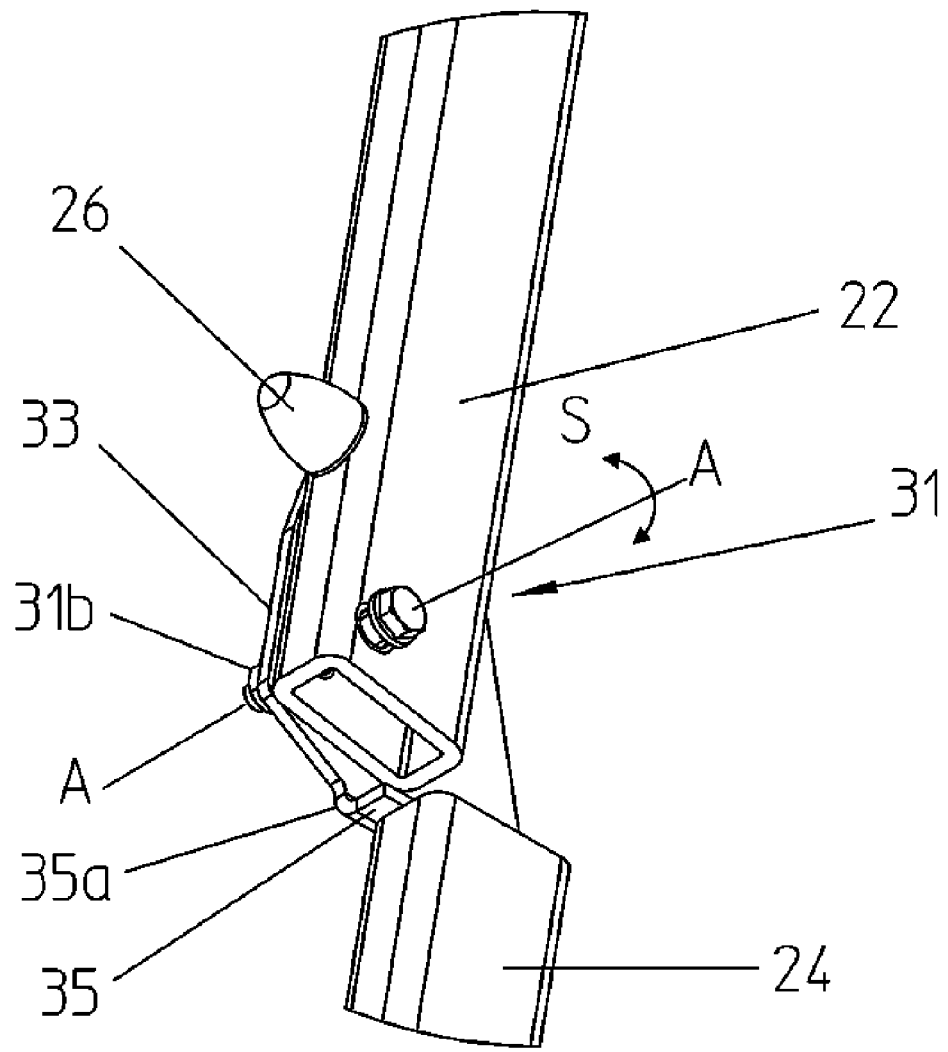
FIG. 5 shows a perspective view of a connection element having only one sheet-metal part.

Each connection element 30 comprises a rotation joint 31 having a pivot axis A. The rotation joint 31 is implemented in such a way that the pivot axis A runs through the pivot tube 22 (FIG. 5). A separate component 14 (FIG. 2) can thus be dispensed with. The rotation joint 31 according to the invention is implemented in a simple way with the aid of a screw 31a, which is received in corresponding holes in the pivot tube 22 and the connection element 30, and is secured from falling out via a screw nut 31b. Rubber cushions 26 ensure a soft impact and a safety spacing between the pivot tube 22 and the stand tube 24, if the roll bar 20 is in the transport position.

Figure 6:
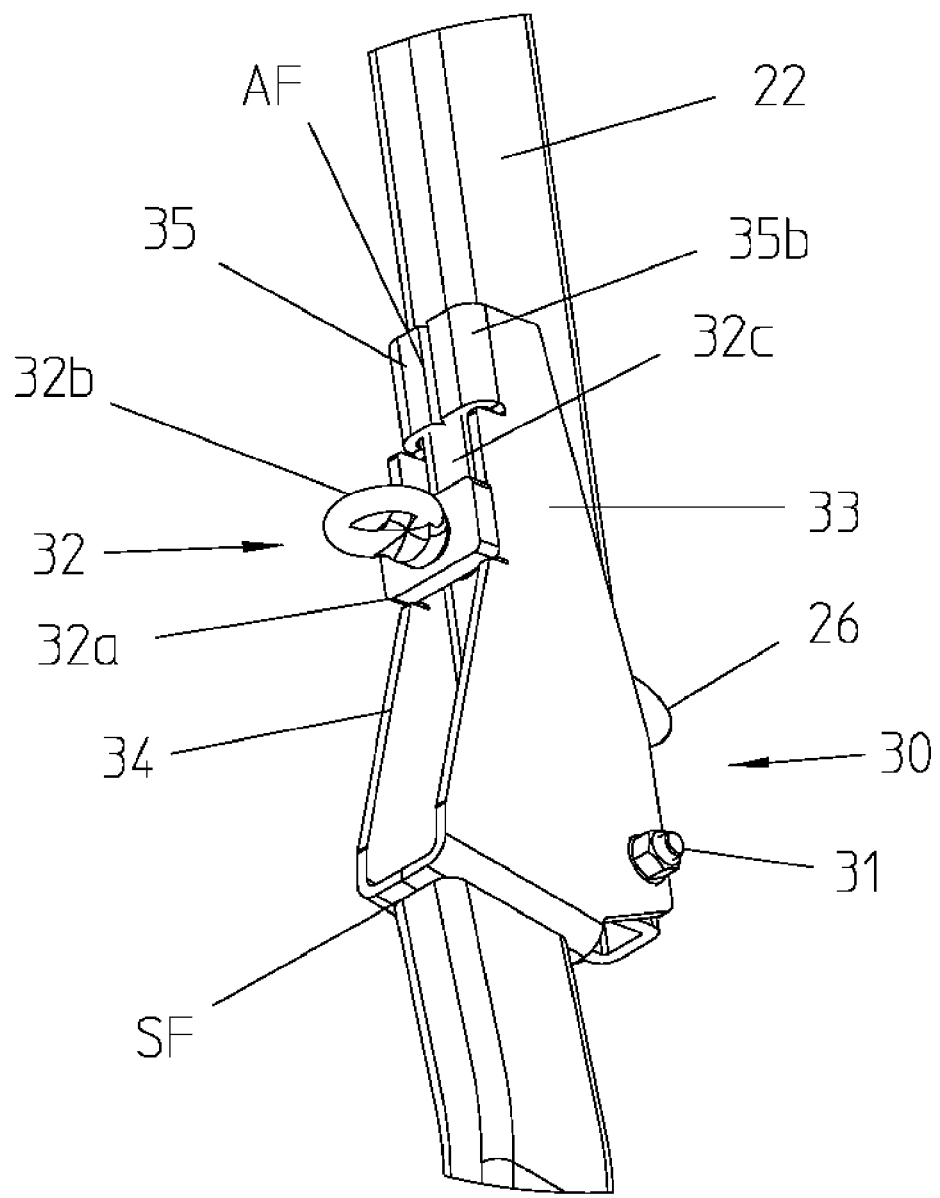
FIG. 6 shows a perspective view of a connection element having two sheet-metal parts symmetrical to one another.

The lock 32, as shown in FIG. 6, has a clamping bolt 32a and a locking screw 32b, for example, an eye bolt, the lock 32 clamping the pivot tube 22 against the connection element 30 in the operating position. When the roll bar 20 is to be moved into the transport position, the screw 32b can be loosened and the clamping bolt 32a can be rotated by 90°, so that the clamping bolt 32a fits in the recess 32c. The pivot tube 22 can thus be pivoted downward around the pivot axis A. The clamping bolt 32a and the locking screw 32b remain fastened on the pivot tube side, so that they cannot be lost.

FIGS. 5 and 6 show how the stop surfaces AF and the welding surfaces SF are formed as edge profiles 35 of the sheet-metal parts 33, 34. For this purpose, the stamped-out sheet-metal blank parts are edged at the locations 35a, 35b. The pivot tube 22 comes to rest on the stop surface AF when the roll bar 20 is in the operating position. A separate stop element does not have to be welded onto the connection element 30. Material, weight, and work effort are thus reduced. In addition, welding warping is avoided at this location. Through the implementation of the welding surface SF as an edge profile 35 and through the horizontal orientation of the welding surface SF, the connection element 30 can be placed abutting the stand tube 24 and peripherally welded, for example. The welding warping is effectively prevented by this type of welding. The weld seam (not shown) can also be implemented as only partially peripheral, however. It is important that the weld seams are situated symmetrically with respect to the center point of the welding surface SF, so that a symmetrical load of the welding surface SF can occur. The welding warping is thus effectively reduced.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A roll bar for a cab-less construction machine which is implemented as adjustable in height between an operating position and a transport position, comprising:
   a pivotable tube bow having two vertical pivot tubes;
   two stand tubes fixedly connected to a frame of the construction machine;
   two connection elements, via which the pivot tubes are connected to the stand tubes, the connection elements each comprising:
      a stop surface against which the pivot tube can be moved to in the operating position;
      a lock configured to clamp the pivot tube against the connection element in the operating position;
      a welding surface to which the stand tube is bonded; and
      a pivot joint having a pivot axis around which the pivot tubes are pivotable, wherein the connection elements each comprise two sheet-metal parts which are symmetrical to one another, the stop surfaces and the welding surfaces being implemented as edge profiles of the sheet-metal parts and the welding surfaces being oriented essentially horizontally.

2. The roll bar according to claim 1,
wherein the pivot joints are implemented in such a way that the pivot axis runs through the pivot tubes.

3. The roll bar according to claim 1,
wherein the connection elements are materially bonded to the stand tubes using weld seams, the weld seams being at least partially peripheral fillet welds or butt welds, and being symmetrically situated with respect to center points of the welding surfaces.

4. The roll bar according to claim 1,
wherein the lock has a clamping bolt and a locking screw the clamping bolt and the locking screw being situated on the pivot tube side.

5. The roll bar according to claim 4,
wherein the connection elements have recesses in the area of the clamping bolt the recesses (being implemented in such a way that the clamping bolts clamp the pivot tubes against the connection elements in the operating position and release the pivot tubes in the transport position.

6. The roll bar according to claim 1, wherein the construction machine comprises a vibration roller.

* * * * *

UNITED STATES PATENT AND TRADEMARK OFFICE
CERTIFICATE OF CORRECTION

PATENT NO. : 8,403,363 B2
APPLICATION NO. : 13/077050
DATED : March 26, 2013
INVENTOR(S) : Duenchel et al.

It is certified that error appears in the above-identified patent and that said Letters Patent is hereby corrected as shown below:

In the Specification

In column 4, line 42, change "it is not the intention of Applicant to restrict" to --it is not the intention of Applicants to restrict--.

In the Claims

In column 6, line 7, change "of the clamping bolt the recesses (being implemented" to --of the clamping bolt, the recesses being implemented--.

Signed and Sealed this
Eighteenth Day of June, 2013

Teresa Stanek Rea
*Acting Director of the United States Patent and Trademark Office*